UNITED STATES PATENT OFFICE.

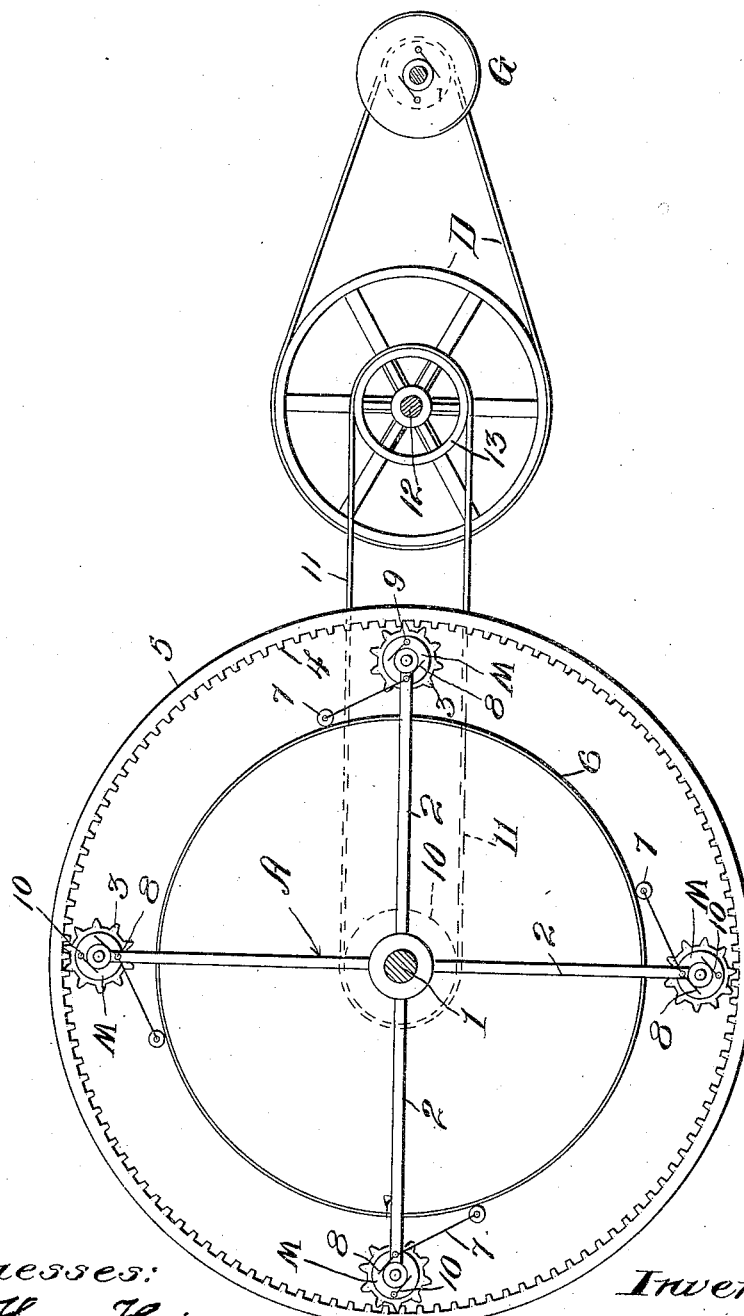

CHRISTIAN CARL TUCH, OF HONOLULU, TERRITORY OF HAWAII.

POWER-GENERATOR.

938,918.  Specification of Letters Patent.  Patented Nov. 2, 1909.

Application filed July 29, 1907. Serial No. 386,145.

*To all whom it may concern:*

Be it known that I, CHRISTIAN CARL TUCH, residing in Honolulu, in the Territory of Hawaii, United States of America, have invented a new and useful Power-Generator in which Leverage is Utilized to Generate Power.

This invention relates to apparatus for converting electrical into mechanical power and relates more particularly to a power transmitting mechanism whereby a plurality of revolving motors mounted on a suitable frame impart rotation to a shaft from which power can be utilized for any desired purpose.

The invention has for one of its objects to improve and simplify the construction and operation of apparatus of this character so as to be comparatively easy and inexpensive to manufacture, reliable in use, and capable of producing great power.

Another object of the invention is the provision of a power transmitting mechanism consisting of a rotary element carrying one or more motors which reacts on a stationary element for causing rotation of the first rotating element.

A still further object is to provide a stationary element having gear teeth and with which coöperate a plurality of electric motors mounted on a rotary element and having pinions meshing with the said gear teeth whereby the rotation of the armatures will cause the second mentioned element to be revolved, current being supplied to the motors by means of a circular trolley wire over which run trolleys carried by the motors.

With these and other objects in view, as will appear as the description proceeds, the invention comprises various novel features of construction and arrangement of parts which will be hereinafter more fully described and set forth with particularity in the claim appended hereto.

In the accompanying drawing, illustrating the invention, the figure shows a side elevation of my improved power transmitting mechanism.

Referring to the drawing, 1 designates a shaft of the mechanism mounted in suitable bearings and carrying a rotatable element A having radial arms or levers 2 and on the extremity of each arm is a motor M, the shaft of which is provided with a pinion 3. The pinions of the motors mesh with the internal teeth 4 of a stationary element 5, the teeth being concentric with the shaft 1. Mounted on the element 5 is a circular trolley wire or conductor 6 that is connected with a suitable source of current. Each motor has a trolley wheel 7 that runs over the wire and is connected with one of the brushes 8 of the motor, the opposite brush 9 being grounded or connected with the opposite side of the electric circuit from that with which the trolley wire 6 is connected.

In practice, when the power circuit is closed current passes from the trolley wire 6 through the trolley wheel to the brushes 8 of the various motors, thence through the motor and brushes 9 and back to the source. This causes the armatures of the motors to rotate and the pinions 3 rotating therewith react on the teeth of the fixed element 5 and cause the movable element A to rotate, the motors being located at the ends of the arms 2 contribute to give a fly wheel effect to the element 5.

The rotation of the shaft 1 may be utilized for any desired purpose. In the present instance, the power is employed for driving a dynamo electric machine G such for instance as an alternator, phase changer, rotary transformer or direct current generator. On the shaft 1 is a pulley 10 over which passes a belt 11 which drives a secondary shaft 12, which has a pulley 13 around which the belt passes. Between the secondary shaft 12 and rotor of the machine G a pulley device D serves as a speed multiplier.

From the foregoing description taken in connection with the accompanying drawing, the advantages of the construction and method of operation will be readily understood by those skilled in the art to which the invention appertains, and while I have described the principle of operation of the invention together with the apparatus which I now consider to be the best embodiment thereof, I desire to have it understood that the apparatus shown is merely illustrative and that such changes may be made when desired as are within the scope of the claim.

Having thus fully described the invention, what is claimed as new is:—

In a power generator, the combination of a rotary shaft, an annular stationary element provided with internal gear teeth arranged concentrically around the shaft, a member mounted on the shaft to rotate therewith, said member being provided with a series of radial arms, motors upon the outer ends of the arms, each having an armature-driven shaft, pinions on the armature-driven shafts meshing with the internal gear teeth of the stationary member for rotating the said rotary member, a fixed annular conductor of less diameter than said stationary element and arranged concentrically with said internal gear teeth and around said shaft and disposed between the shaft and motors, an inwardly extending spring pressed trolley pole yieldingly mounted on each motor and rotating therewith and arranged tangentially with relation to the conductor, and contact devices carried by the poles and running in engagement with the outer surface of said conductor.

CHRISTIAN CARL TUCH

Witnesses:
W. T. SCHMIDT,
F. KLAMP.